(12) United States Patent
Jin et al.

(10) Patent No.: US 6,687,262 B1
(45) Date of Patent: Feb. 3, 2004

(54) DISTRIBUTED MUX SCHEME FOR BI-ENDIAN ROTATOR CIRCUIT

(75) Inventors: Daming Jin, Fort Collins, CO (US); Dean A. Mulla, Saratoga, CA (US); Douglas J Cutter, Fort Collins, CO (US); Thomas Grutkowski, Fort Collins, CO (US)

(73) Assignees: Hewlett-Packard Development Company, L.P., Houston, TX (US); Intel Corporation, Santa Clara, CA (US)

( * ) Notice: Subject to any disclaimer, the term of this patent is extended or adjusted under 35 U.S.C. 154(b) by 0 days.

(21) Appl. No.: 09/510,280

(22) Filed: Feb. 21, 2000

(51) Int. Cl.[7] .................................................. H04J 3/00
(52) U.S. Cl. ...................... 370/476; 370/300; 370/303; 370/535; 710/51; 710/52; 710/62; 710/65; 712/300
(58) Field of Search .................................. 370/300, 303, 370/465, 472, 473, 476, 535; 710/36, 51, 52, 62, 65, 66; 712/300

(56) References Cited

U.S. PATENT DOCUMENTS

| | | | | |
|---|---|---|---|---|
| 5,446,482 A | * | 8/1995 | Van Aken et al. | 345/199 |
| 5,524,256 A | * | 6/1996 | Turkowski | 395/800 |
| 5,845,100 A | | 12/1998 | Gupta et al. | |
| 5,867,672 A | * | 2/1999 | Wang et al. | 395/307 |
| 6,212,539 B1 | * | 4/2001 | Huck et al. | 708/495 |

OTHER PUBLICATIONS

German Office Action dated Dec. 4, 2001.

* cited by examiner

*Primary Examiner*—Dang Ton
*Assistant Examiner*—Shick Hom

(57) ABSTRACT

The inventive control logic provides the selection signals for a bi-endian rotator MUX. The logic determines the starting point for the data transfer by determining which input register byte is going to Byte 0 of the output register. The control logic passes the starting point to single decoder. The decoded value is then sent to a plurality of MUXs, one for each of the output register bytes. Each of the MUXs is prewired to receive a portion of bits of the decoded value, and the portion is arranged in a particular order. The MUXs then send their respective outputs to the rotator MUX as selection control signals.

16 Claims, 4 Drawing Sheets

DISTRIBUTED MUX SCHEME FOR BI-ENDIAN ROTATOR CIRCUIT

RELATED APPLICATIONS

This application is related to co-pending and commonly assigned U.S. patent application Ser. No. 09/510,277 entitled "DUAL BYTE PORT ROTATOR," the disclosures of which are hereby incorporated herein by reference.

TECHNICAL FIELD

This invention relates in general to computer systems, and in specific to an arrangement for a cache memory system rotator.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is generally transparent to a computer program at the instruction level and can thus be added to a computer architecture without changing the instruction set or requiring modification to existing programs.

Computer processors typically include cache for storing data. When executing an instruction that requires access to memory (e.g., read from or write to memory), a processor typically accesses cache in an attempt to satisfy the instruction. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly. Caches have been configured in both on chip and off-chip arrangements. On-processor-chip caches have less latency, since they are closer to the processor, but since on-chip area is expensive, such caches are typically smaller than off-chip caches. Off-processor-chip caches have longer latencies since they are remotely located from the processor, but such caches are typically larger than on-chip caches.

A rotator is used in a processor for rotating and transferring a data word, which contains one or more bytes of information, from an origination register to a destination register. In conventional multi-pipeline processors, these registers correspond to pipeline stage latches. Data is "piped" from one pipestage (origination register) to another pipestage (destination register) in preparation for writing it later into the cache.

Based on a control signal (or signals), the register bytes are rotated from 0 to n places in a predefined direction (e.g. to the left) as they are stored in the destination register. In some cases, the rotator may also have the capability to store the rotated word in either a little or big endian format.

FIG. 1 shows first and second 8-byte (64 bit) registers 40 and 60, respectively, for representing an 8 byte register and illustrating the difference between little and big endian formats. Each register includes bytes A through H, where A corresponds to the lowest byte address of the register, and H corresponds to the highest byte address there within. In general, little or big endian refers to which bytes are most significant in multi-byte data types. In big-endian architectures, the leftmost bytes (those with a lower address) are most significant. Conversely, in little-endian architectures, the higher address bytes are most significant.

FIG. 2 shows a block representation of a single Port rotator 70 for rotating and transferring bytes A though H from 8 byte origination register 62 to a corresponding 8 byte destination register 64. Rotator 70 receives an endian mode signal (le/be) at 72 and a rotate control signal (sel[0:7]) at 74. The endian mode signal indicates the appropriate endian (little, big) format for the rotated word. In the depicted scheme it is assumed that the origination register is in a little endian format, i.e., byte A is the least significant byte and byte H is the most significant byte. Thus, if the endian signal is active, the rotated word is also translated into a big endian format before being stored in the destination register. The rotation control signal (which includes sel 0 to sel 7) forms a one-hot byte (or vector) indicating how many places the bytes are to be rotated in a wrap-around rotational scheme. In other words, only one of the 8 bits of the rotation control signal is active. This active bit corresponds to the desired destination location of the least significant byte (which hereafter will be referred to as byte A or byte 0) after the rotation occurs. For example, a rotation control byte value of 00000001 indicates that origination byte A needs to end up in destination byte A (i.e., no rotation). Another example is a rotation control value of 10000000 indicating that origination byte A needs to end up in destination byte H, which corresponds to a seven place leftward rotation. In this example, control bytes 00000010 indicate that origination byte H would end up in destination byte G, origination byte G would end up in destination byte F and so on with origination byte B ending up in destination byte A. Notice how this is equivalent to rotating one place to the right. The direction of rotation is an arbitrary conceptual convention.

FIG. 3 shows a conventional single Port, 8 byte rotator 115 for transferring and rotating data from an origination register 103 to a destination register 133. The origination register 103 has eight origination byte latches ("O-latches") 103A–103H, and the destination register has eight destination byte latches ("D-latches") 133A–133H. Rotator 115 includes eight rotator multiplexers 120A–120H and control logic 125. It should be recognized that a byte latch comprises eight individual bit latches for latching a byte of data. However, the latches are represented and addressed in terms of bytes since each of the bits within a given byte (e.g., byte 0) is treated the same with the bytes being manipulated to effectuate the rotation. The same concept applies to the rotator multiplexers 120A–H. That is, they are treated as 8:1 multiplexers for muxing whole bytes of information. However, each multiplexer actually includes 64 inputs with 8 outputs. Each rotator multiplexer 120 has 8 one-hot select inputs for selection of the desired multiplexer path.

All of the 8 outputs from O-latches 103A–H are connected to the inputs of each of the rotator multiplexers 120A–H. In this way, each of the multiplexers can pass through any one of bytes 0 through 7. Each rotator multiplexer output is connected to a corresponding D-latch input. That is, the output of rotator mux. 120A is connected to the input of D-latch 133A, the output of rotator mux. 120B is connected to the input of D-latch 133B and so on with the output of rotator mux. 120H being connected to the input of D-latch 133H. An endian mode select line (le/be) and the rotation control signal (sel[0:7]) are connected as inputs to the control logic 125. Finally, the control logic 125 is connected to each of the rotator multiplexers 120A–H to provide rotation select signals to their select line inputs for determining which byte gets passed through which rotator multiplexer. That is, the control logic in response to the endian mode and rotation control inputs controls each rotator multiplexer so that the appropriate byte will be selected to effectuate the desired rotation in the appropriate endian mode. The control logic 125 provides eight output signals that make up a one-hot rotator select signal that serve as a mux. select for the rotator multiplexers.

Each of these rotator multiplexers get exactly the same select lines from the rotator select signal. In contrast, the data path inputs to each of these multiplexers are configured differently. They each receive all eight origination bytes: byte 0 to byte 7, but they are arranged in a slightly different order to effectuate the various rotation combinations. In operation within the select logic 125, the endian select signal combines with the one-hot select lines to generate the one-hot, 8 mux select outputs. The activated select line corresponds to the amount of rotation. For example, if the first mux select line is activated with little endian format, then no rotation occurs and the bytes are simply passed through to the destination register. If the second line is activated, then with the scheme in the depicted embodiment, a left 7 (or right 1) shift would occur and so on.

SUMMARY OF THE INVENTION

These and other objects, features and technical advantages are achieved by a system and method which uses rotator MUX control logic that allows for unequal transactions to be processed. For example a register to memory may require output that has more or less data than the input data.

The inventive control logic determines the starting point for the data transfer by determining which input register byte is going to Byte 0 of the output register. For big endian, the control logic adds the desired location and the size of the data transfer minus one. For little endian, the control logic adds one to the negative of the desired location. This is the 2's compliment of the desired location. The control logic passes the starting point to single decoder. The decode converts the starting point into a decoded value or bit stream of 0s and a one. The place of the one indicates the starting point of the output bytes. The decoded value is then sent to a plurality of MUXs, one for each of the output register bytes. Each of the MUXs is prewired to receive a portion of bits of the decoded value, and the portion is arranged in a particular order. The size of the portion is based on the number of input register bytes. The order effects a shifting of the decode value. Thus, large numbers of decodes and shifters are not required. The MUXs then send their respective outputs to the rotator MUX as selection control signals.

It is a technical advantage of the invention to provide control logic for a rotator MUX that permits rotation, as well as, mapping of different sized input and output registers.

It is another technical advantage to perform the mapping and rotation without large numbers of decoders and shifters.

It is a further technical advantage of the invention to determine the starting point for the transaction by using 2's compliment of the desired location for little endian rotations, and using the sum of the desired location and the size of the transaction minus one for big endian rotations.

It is a still further technical advantage of the invention to hard wire the inputs to MUXs to effect shifting of values.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
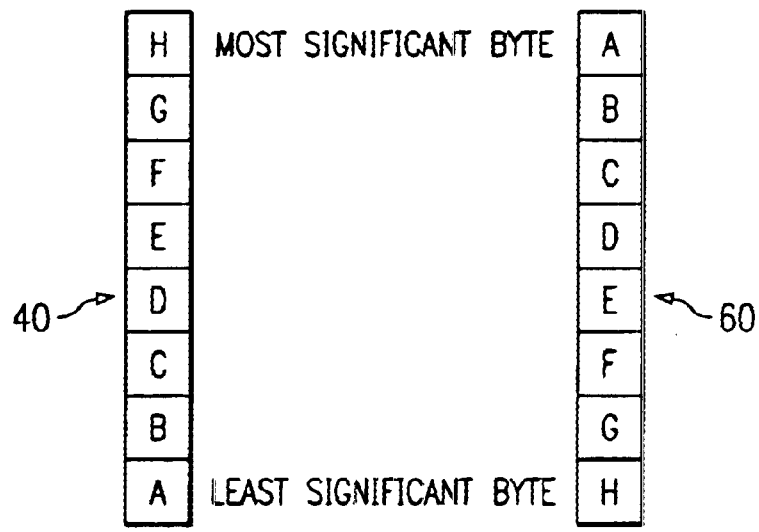
FIG. 1 depicts little and big endian data formats.
Figure 2:
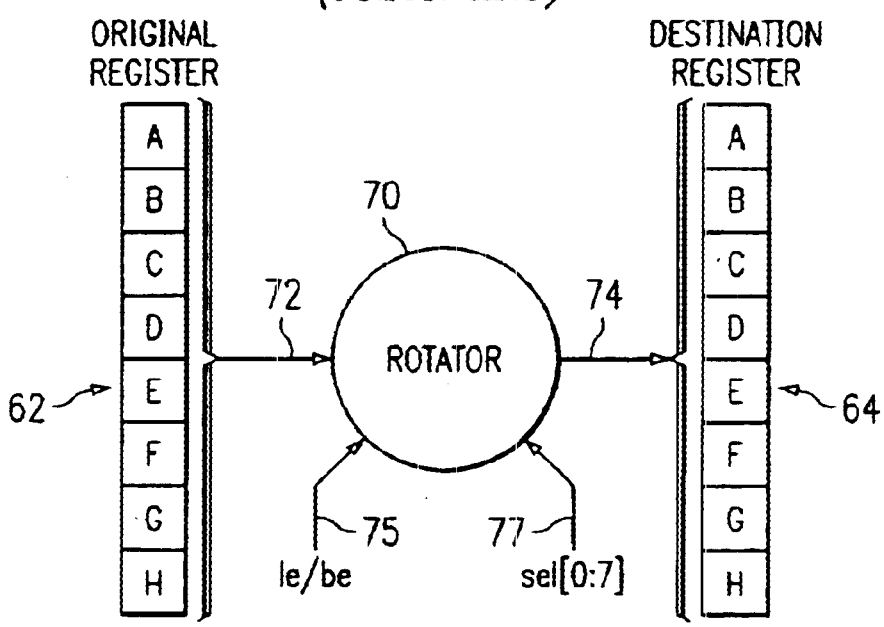
FIG. 2 depicts an arrangement for a conventional rotator.
Figure 3:
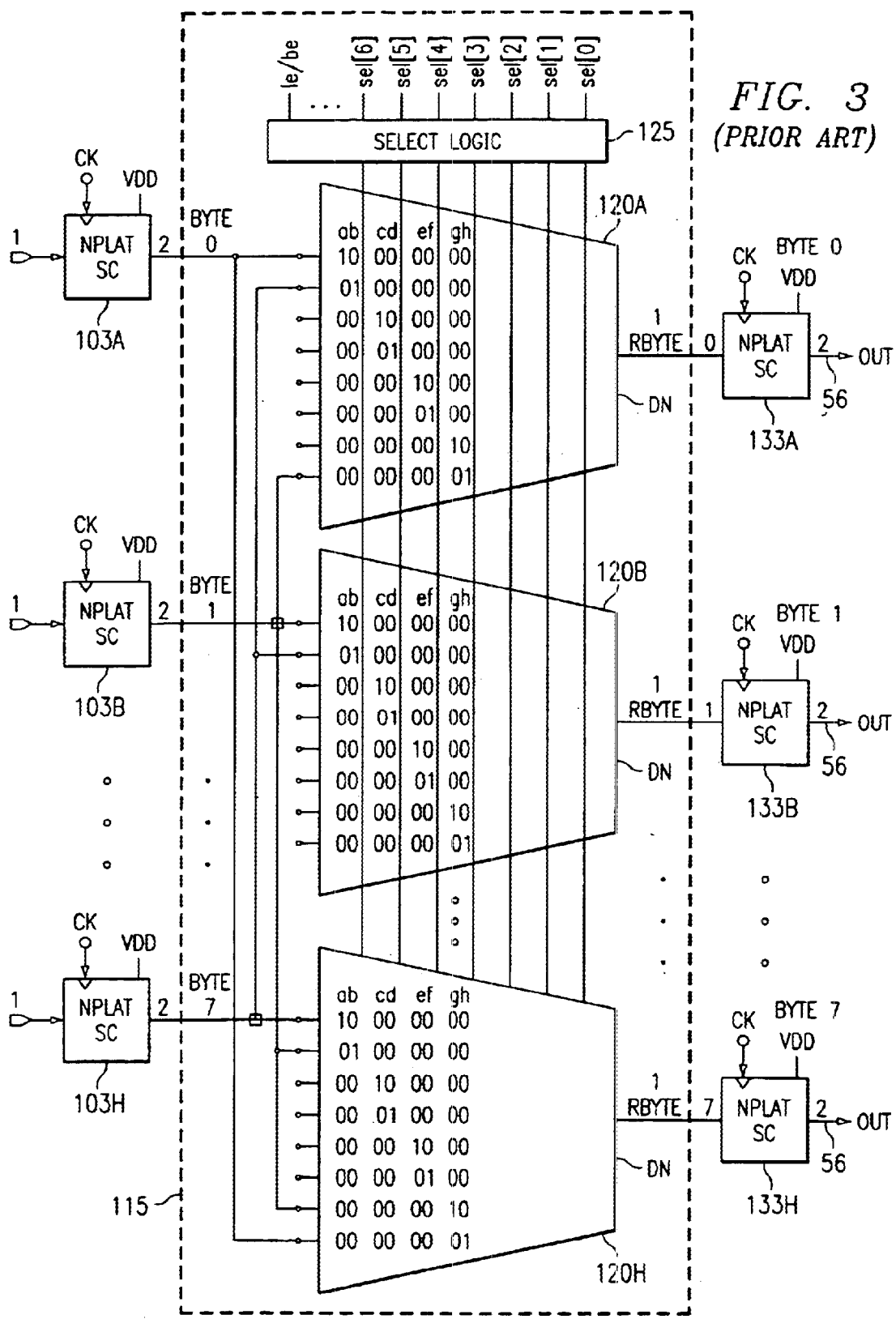
FIG. 3 depicts a schematic arrangement of the rotator of FIG. 2.

As shown in FIG. 3, the rotators produce output data that is the same size as the input data, i.e. 8 bytes in produces 8 bytes out. This is typical for register to register transactions. However other transactions, e.g. register to memory may require output that has more or less data than the input data. Also format conversions, e.g. integer to floating point, may also require output that has more or less data than the input data. These types of rotations are accomplished by manipulating the select lines of the rotator via selection logic 125 of FIG. 3.

Figure 4:
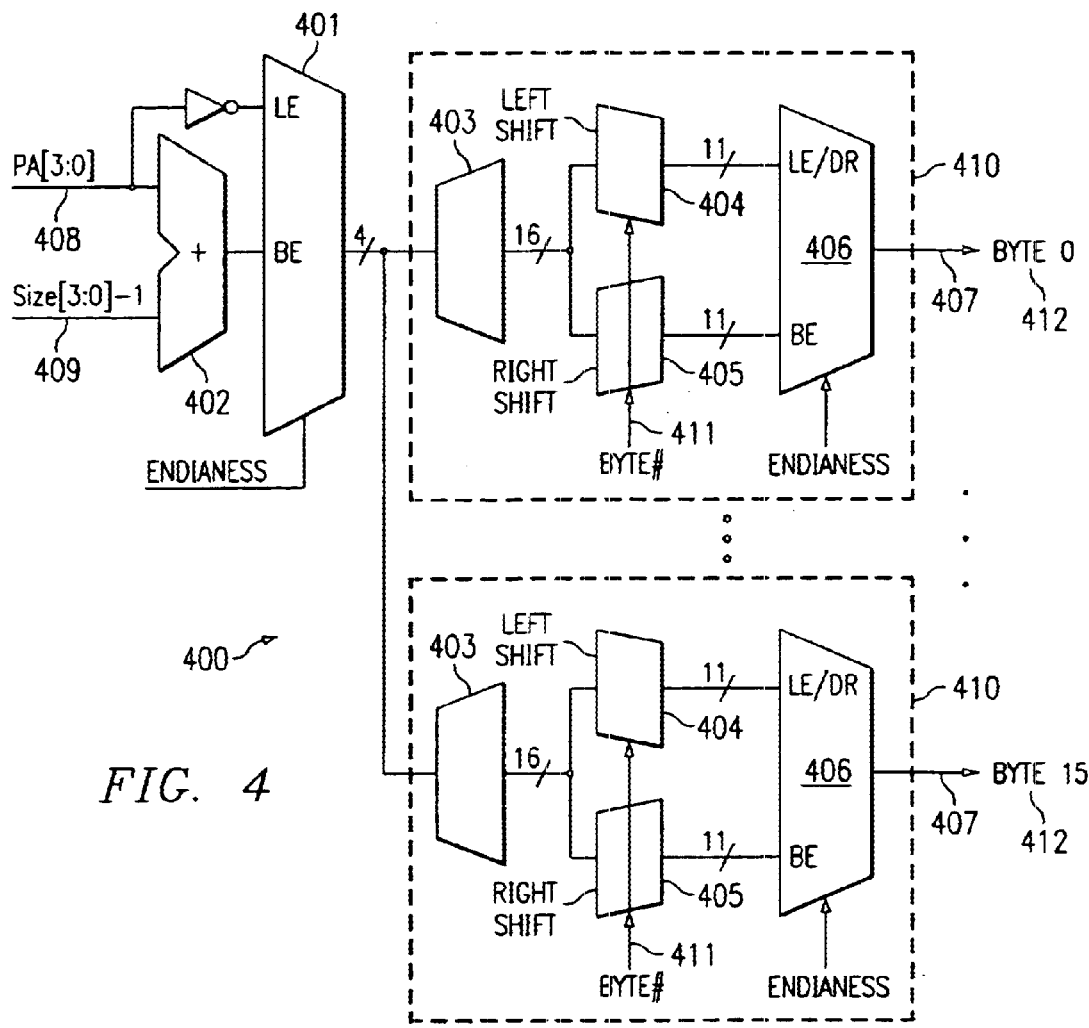
FIG. 4 depicts inventive control logic for a rotator.

The selection logic 400 shown in FIG. 4 is configured to map a 11 byte input to a 16 byte output. This arrangement assumes the input data to be in little endian format (LE). Assume the input data has 11 bytes, i.e. bytes I0, I1, I2, I3, I4, I5, I6, I7, I8, I9, and I10 Assume the output data should have 16 bytes, i.e. O0, O1, O2, O3, O4, O5, O6, O7, O8, O9, O10, O11, O12, O13, O14, and O15. MUX 401 determines the starting address or byte location for output data. The desired starting location of the output data is indicated by PA 408, which comprises 4 bits to represent a 16 output locations. The size of the operation is indicated by Size 409, which comprises 4 bits to represent up to 11 bytes. For LE, the starting location is the negative of the desired location PA 408. For big endian (BE), the starting location is PA 408 plus the Size 409 minus 1. The desired endianess is used to select which calculation is outputted as starting location. Note that if the rotator is disabled, then LE format is used.

The starting location is then sent to 16 shifting rotators 410. Each rotator 410 is configured for the MUX selection of one byte. Each rotator comprises a decoder 403, that receives the starting byte location and decodes that location into a 16 bit number. The 16 bit number is then shifted left by shifter 404 for LE and is shifted right by shifter 405 for BE. The number of places that the number is shifted by is determined by BYTE#411. MUX 406 selects either the LE shifted number or the BE shifted number based on whether LE or BE is desired. The output of this MUX 406 is the byte selection, which means which input data byte is selected for the particular output data byte. The output is an 11 bit number comprising 10 zeros and a one. The one indicates which byte location to be selected. For example, suppose the output for byte 0 (412) is 00000000100. This indicates that byte 0 is to receive the contents of input byte 2, as the third location of the number has the one and the third input location is byte 2 (counting from 0, 1, 2). The output from MUX 406 is provided to an 11 to 16 MUX (not shown) as control logic. That MUX would then select which of the 11 byte inputs are mapped to the 16 byte outputs. Another MUX could then map the 16 byte outputs down to one 128 bit output.

The control logic of FIG. 4 operates in a satisfactory manner. However, this control logic requires a large number of decoders, namely 16, and a large number of shifters, namely 32. This adds complexity to the system, as well as requires a great deal of surface area.

Figure 5A:
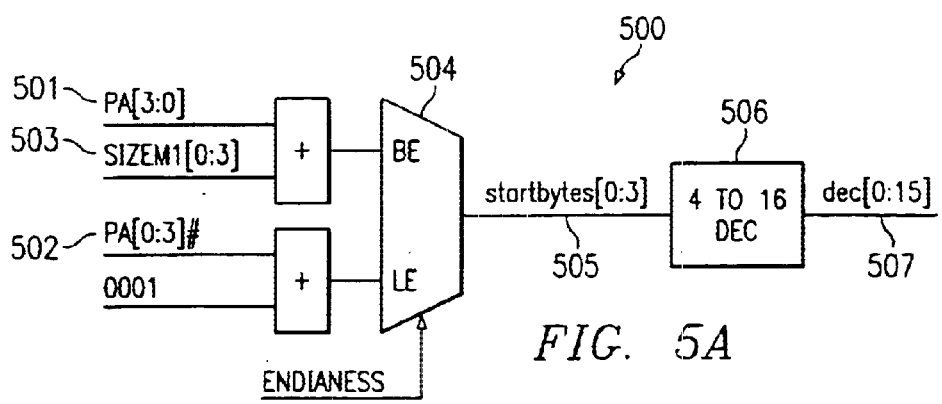
FIGS. 5A and 5B depict a preferred embodiment of the inventive control logic for a rotator.
Figure 5B:
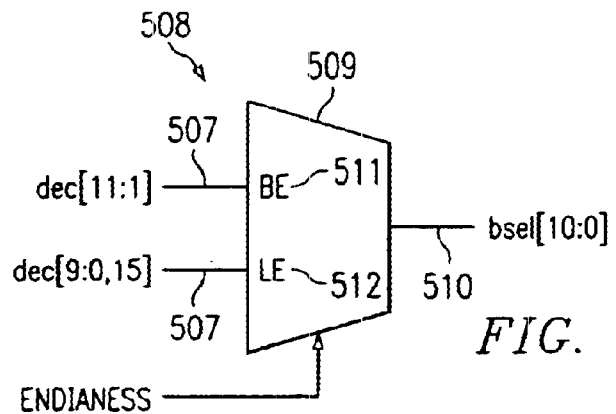

The preferred control logic is shown in FIGS. 5A and 5B. FIG. 5A depicts the logic 500 to determine the starting byte for the operation. Again, assume the input data to be in little endian format (LE). Assume the input data has 11 bytes, i.e. bytes I0, I1, I2, I3, I4, I5, I6, I7, I8, I9, and I10. Assume the output data should have 16 bytes, i.e. O0, O1, O2, O3, O4, O5, O6, O7, O8, O9, O10, O11, O12, O13, O14, and O15. Note that these assumptions are by way of example only, as other the logic could be configured to operate with BE input data, and other input or output sizes. MUX 504 determines the starting address or byte location for output data. In this instance the starting location is noted as which input byte is going to Byte 0 of the output data. The starting location, startbytes 505 comprises 4 bits to represent a 16 output locations.

For BE, the starting location is the desired location PA 501 plus the size of the data involved in the operation minus 1. For example, suppose a four byte of input data is desired to be written or stored into byte 2 output location (of byte locations 0, 1, 2 . . . 15). Thus the input would look like:

| 10 | 9  | 8  | 7  | 6  | 5  | 4  | 3 | 2 | 1 | 0 | :inputbyte locations |
|----|----|----|----|----|----|----|---|---|---|---|----------------------|
| x7 | x6 | x5 | x4 | x3 | x2 | x1 | d | c | b | a | :byte contents       |

The starting location 505 is then 2+4−1=5. This location is then decoded into 16 bits by decoder 506. This decode value is provided to the logic shown in FIG. 5B. Note that only a single decoder is needed, and no shifters are required. The logic in FIG. 5B will select the output data based on the decoder value. The output would look like:

| 15 | 14 | 13 | 12 | 11 | 10 | 9  | 8  | :output register byte locations |
|----|----|----|----|----|----|----|----|---------------------------------|
| x3 | x4 | x5 | x6 | x7 | 0  | 0  | 0  | :byte contents                  |
| 7  | 6  | 5  | 4  | 3  | 2  | 1  | 0  | :output register byte locations |
| 0  | 0  | a  | b  | c  | d  | x1 | x2 | :byte contents                  |

Note that byte register 2 contains the data from input register 3. Also, note that byte register 0 contains the data from input register 5, and that the value abcd has been transposed into big endian format. Further note that registers 10-6 have been filled with zeros, as there was no data to write into these registers. This is known as zero extending.

For LE, the starting location is the negative desired location PA 501 plus one. This is the 2's complement of the desired location PA. The negative desired location is 1's complement, and when adding one to this value, 2's complement is the result. For example, suppose a four byte of input data is desired to be written or stored into byte 2 output location (of byte locations 0, 1, 2 . . . 15). Thus the input would look like:

| 10 | 9  | 8  | 7  | 6  | 5  | 4  | 3 | 2 | 1 | 0 | :input byte locations |
|----|----|----|----|----|----|----|---|---|---|---|-----------------------|
| x7 | x6 | x5 | x4 | x3 | x2 | x1 | d | c | b | a | :byte contents        |

The starting location 505 is then −2 which is 1101 plus 0001 equals 1110, which is 14. Another way to view this is 2 is 0010. The 1's complement is switching 0's to 1's and 1's to 0's, which results in 1101. Adding 0001 to this results in 1110, which is 14, or byte 14. This location is then decoded into 16 bits by decoder 506. This decode value is provided to the logic shown in FIG. 5B. Note that only a single decoder is needed, and no shifters are required. The logic in FIG. 5B will select the output data based on the decoder value. The output would look like:

| 15 | 14 | 13 | 12 | 11 | 10 | 9  | 8  | :output register byte locations |
|----|----|----|----|----|----|----|----|---------------------------------|
| 0  | 0  | 0  | x7 | x6 | x5 | x4 | x3 | :byte contents                  |
| 7  | 6  | 5  | 4  | 3  | 2  | 1  | 0  | :output register byte locations |
| x2 | x1 | d  | c  | b  | a  | 0  | 0  | :byte contents                  |

Note that byte register 0 contains the data from input register 14, which does not exist, and thus is written with a 0. Also, byte register 1 has the data from input register 15, which does not exist, and thus is written with a 0. And, byte register 2 has the data from input register 0. Further note that the value abcd has not been transposed, and remains in little endian format. Further note that registers 13–15 and 0–1 have been filled with zeros, as there was no data to write into these registers.

Consequently, by determining which input value will be selected for output byte value 0, greatly reduces the complexity and number of components required for rotation.

Figure 6:
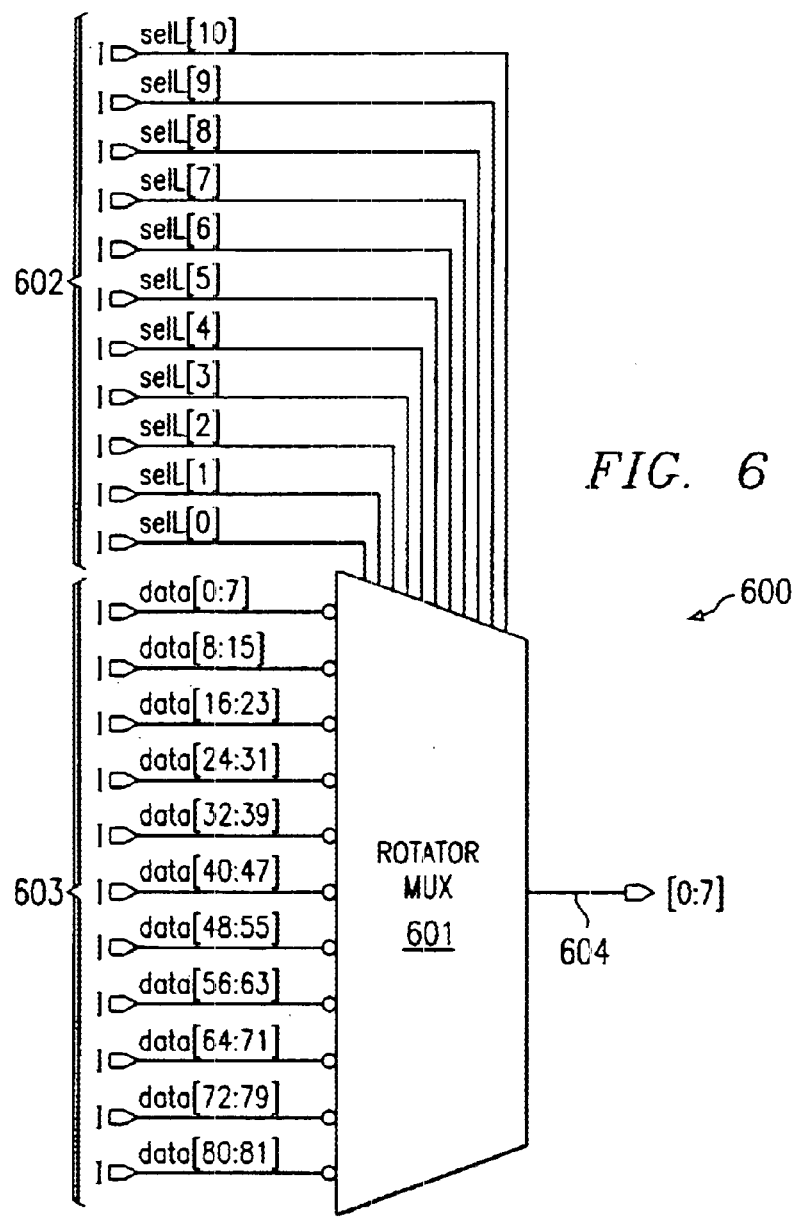
FIG. 6 depicts a rotator using the control logic of FIG. 5A and 5B.

The decoded value is sent to 16 MUXs, one MUX 508 of which is shown in FIG. 5B. This MUX 508 has been hard wired to receive particular bits of the decoded signal and in a particular order for the byte 1 of the output (i.e. 0, 1, 2 . . . ). The BE input 511 receives bits 11:1 of the decoded signal 507. The LE input 512 receives bits 9:0, 15 of the decoded signal 507. MUX 509 selects one of the inputs based on whether BE or LE is desired. The output of MUX 509 is used as selection control line data for the rotator mux 601 of FIG. 6.

The 16 MUXs, like that of MUX 508 would receive LE and BE inputs according to their respective output bytes. Note that this wiring scheme is by way of example only, as a different input size, e.g. 12 bytes, or a different output size, e.g. 24 bytes, would require different wiring. These MUXs would receive the inputs as follows:

| Byte 0        | Byte 1         | Byte 2         | Byte 3         |
|---------------|----------------|----------------|----------------|
| BE:dec[10:0]  | BE:dec[11:1]   | BE:dec[12:2]   | BE:dec[13:3]   |
| LE:dec[10:0]  | LE:dec[9:0,15] | LE:dec [8:0,15:14] | LE:dec [7:0,15:13] |

| Byte 4        | Byte 5         | Byte 6         | Byte 7         |
|---------------|----------------|----------------|----------------|
| BE:dec[14:4]  | BE:dec[15:5]   | BE:dec[0,15:6] | BE:dec [1:0,15:7] |
| LE:dec[6:0,15:12] | LE:dec[5:0,15:11] | LE:dec [4:0,15:10] | LE:dec [3:0,15:9] |

-continued

| Byte 8 | Byte 9 | Byte 10 | Byte 11 |
|---|---|---|---|
| BE:dec[2:0,15:8] | BE:dec[3:0,15:9] | BE:dec[4:0,15:10] | BE:dec[5:0,15:11] |
| LE:dec[2:0,15:8] | LE:dec[1:0,15:7] | LE:dec[0,15:6] | LE:dec[15:5] |

| Byte 12 | Byte 13 | Byte 14 | Byte 15 |
|---|---|---|---|
| BE:dec[6:0,15:12] | BE:dec[7:0,15:13] | BE:dec[8:0,15:14] | BE:dec[9:0,15] |
| LE:dec[14:4] | LE:dec[13:3] | LE:dec[12:2] | LE:dec[11:1] |

Note that the wiring scheme is shifting the bits of the decoded value. Thus, the values that each of the MUXs receives has been shifted by the hard wiring.

Continuing with the LE example from above, the decoded value for 14 would be 0000000000000100. Note that the 14$^{th}$ bit is 1, and the remaining are 0s. The 0 byte MUX would generate 00000000000, eleven 0s, as it is wired to receive 10:0 bits, with the 1 being bit 14. The 1 byte MUX would generate 00000000000, eleven 0s, as it is wired to receive 9:0,15 bits. The 2 byte MUX would generate 00000000001, as it is wired to receive 8:0,15:14. This indicates that the 2 output byte is to receive the 0 input byte data. The 3 byte MUX would generate 00000000010, as it is wired to receive 7:0,15:13. This indicates that the 3 output byte is to receive the 1 input byte data. The remaining MUXs generate their respective values. Each of these 11 bit values 510, is sent to the rotator MUX 601 of FIG. 6 as 11 bit selection control input 602. These inputs select the different data inputs 603 as particular outputs.

Note that each bit of the output 510 is provided to a different select line 602. Further note that rotator MUX 601 is one of 16 MUXs, with MUX 601 producing the least significant byte, i.e. bits [0:7], the next MUX would produce bits [8:15], etc., up to the last MUX which would produce bits [120:127]. Each rotator MUX receives the same control lines 602 and the same inputs 603. MUXs that are not selected to output the input information 603 produce logical 0's as output, by default.

Thus, the inventive rotator control logic will allow for rotation, as well as, for mapping a smaller input register to a larger output register. Note that the invention could be configured allow mapping for a larger input register to a smaller output register. Also note that data in less than a full byte can be processed, i.e. 82 bits instead of 88 (11 bytes). The space or difference could be filled with 0s or other data by the rotator MUX system. Further note that the inventive system can operate will less than the full amount of bytes. For example, the input register above has 11 bytes, however less than 11 may be filled with data. The remainder could be filled with 0s or other data by the rotator MUX system. This is how format conversions, e.g. integer to floating point or vice versa, may be handled.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for controlling a multiplexer which transfers data from an first location
to an second location, wherein each of the first and second locations include a plurality of bytes, and the data is formatted in one of big endian format and little endian format, the system comprising:
start logic that determines start byte information, wherein the start byte is which input byte location will have its data transferred to the first byte of the second location, and wherein the start logic comprises first logic for determining the first start byte for the big endian format, second logic for determining the second start byte for the little endian format, and a format selection multiplexer for selecting between the first logic and the second logic, based upon an endian signal, and producing an output start byte which is associated with the start byte information; and
a plurality of instantiations of logic, each of which is associated with a particular one of the plurality of bytes of the second location, wherein each logic is configured for its associated byte and forms a selection signal based on the start byte information;
wherein the plurality of selection signals from the plurality of instantiations of logic control the multiplexer, and the first logic comprises a summer that adds a desired location signal, a size of the data, and minus logical one.

2. The system of claim 1 wherein the second logic comprises:
complement logic that computes the twos complement of a desired location signal.

3. The system of claim 2 wherein the complement logic comprises:
a summer that adds a one's complement of the desired location signal and logical one.

4. The system of claim 1 wherein the start logic further comprises:
a decoder, which receives the output start byte, and produces a bit stream comprising a number of bits equal to the number of bytes of the plurality of bytes of the second location, wherein the bit stream is the start byte information.

5. The system of claim 4 wherein the data is formatted in one of big endian format and little endian format; and wherein:
each logic instantiation of the plurality of instantiation of logic is arranged to receive a first portion of the bit stream in a first order for big endian format; and
each logic instantiation of the plurality of instantiation of logic is arranged to receive a second portion of the bit stream in a second order for little endian format.

6. The system of claim 5 wherein:
each first order is different for each logic instantiation, and is shifted with respect to adjacent instantiations; and
each second order is different for each logic instantiation, and is shifted with respect to adjacent instantiations.

7. The system of claim 5 wherein each of the plurality of instantiation of logic comprises:
a format selection multiplexer for selecting between the first portion and the second portion, based upon an endian signal, and producing the selection signal.

8. The system of claim 1 wherein:
the first location has fewer bytes than the second location.

9. A method for controlling a multiplexer which transfers data from an first location to an second location, wherein each of the first and second locations include a plurality of bytes, and the data is formatted in one of big endian format and little endian format, the method comprising the steps of:
determining start byte information, wherein the start byte is which input byte location will have its data transferred to the first byte of the second location;
providing a plurality of instantiations of logic, each of which is associated with a particular one of the plurality of bytes of the second location, wherein each logic is configured for its associated byte; and
forming, via the plurality of instantiations of logic, a plurality of selection signals based on the start byte information for controlling the multiplexer;
wherein the step of determining start byte information comprises the steps of:
determining the first start byte for the big endian format, which comprises adding a desired location signal, a size of the data, and minus logical one;
determining the second start byte for the little endian format; and
selecting between the first logic and the second logic, based upon an endian signal, to produce an output start byte which is associated with the start byte information.

10. The method of claim 9 wherein the step of determining the second start byte comprises the step of:
computing the twos complement of a desired, location signal.

11. The method of claim 10 wherein the step of computing comprises the step of:
adding a one's complement of the desired location signal and logical one.

12. The method of claim 9 wherein the step of determining start byte information comprises the step of:
decoding the output start byte into a bit stream comprising a number of bits equal to the number of bytes of the plurality of bytes of the second location, wherein the bit stream is the start byte information.

13. The method of claim 12 wherein the data is formatted in one of big endian format and little endian format; and wherein the step of providing a plurality of instantiations of logic comprises the steps of:
arranging each logic instantiation of the plurality of instantiation of logic to receive a first portion of the bit stream in a first order for big endian format; and
arranging each logic instantiation of the plurality of instantiation of logic to receive a second portion of the bit stream in a second order for little endian format.

14. The method of claim 13 wherein:
each first order is different for each logic instantiation, and is shifted with respect to adjacent instantiations; and
each second order is different for each logic instantiation, and is shifted with respect to adjacent instantiations.

15. The method of claim 13 wherein the step of forming, comprises the step of:
selecting, by each instantiation, between the first portion and the second portion, based upon an endian signal, and producing the plurality of selection signals.

16. The method of claim 9 wherein:
the first location has fewer bytes than the second location.

* * * * *